United States Patent [19]

Fujimoto

[11] Patent Number: 5,130,919

[45] Date of Patent: Jul. 14, 1992

[54] INDUSTRIAL MACHINE CONTROL DEVICE FOR MONITORING MECHANICAL COORDINATE DATA OF A CONTROLLED MACHINE

[75] Inventor: Akihiko Fujimoto, Aichi, Japan

[73] Assignee: Mitsubishi Denki K.K., Tokyo, Japan

[21] Appl. No.: 435,231

[22] Filed: Nov. 13, 1989

[30] Foreign Application Priority Data

Nov. 11, 1988 [JP] Japan .................................. 63-284020
Nov. 22, 1988 [JP] Japan .................................. 63-293484

[51] Int. Cl.⁵ ...................... G05B 19/19; G05B 19/405
[52] U.S. Cl. ...................... 364/136; 364/142; 364/167.01; 364/474.28; 318/626
[58] Field of Search ............ 364/136, 142, 167.01, 364/474.01, 474.28; 318/626

[56] References Cited

U.S. PATENT DOCUMENTS

| 4,158,226 | 6/1979 | Struger et al. ........ 364/142 |
| 4,242,621 | 12/1980 | Spaulding ........ 364/142 X |
| 4,401,930 | 8/1983 | Kato et al. ........ 364/142 X |
| 4,470,108 | 9/1984 | Kato et al. ........ 364/142 X |
| 4,744,022 | 5/1988 | Kumar et al. ........ 364/142 |

FOREIGN PATENT DOCUMENTS 0137852 4/1985 European Pat. Off. .

OTHER PUBLICATIONS

Control Engineering, vol. 21, No. 11, Nov. 31, 1974, p. 32.
Patent Abstracts of Japan, vol. 11, No. 12 (P-535)[2459], Jan. 13, 1987.
European Search Report, Feb. 16, 1990 by Nettesheim J.

Primary Examiner—Joseph Ruggiero
Attorney, Agent, or Firm—Sughrue, Mion, Zinn Macpeak & Seas

[57] ABSTRACT

This invention relates to an industrial machine control device for controlling machine tools and other industrial machines. The industrial machine control device is able to provide a predetermined position arrival signal with no detectors attached to the machine, and therefore it is possible to carry out the positioning of a movable member with high accuracy and reliability regardless of the life period of time of the detectors which are required in conventional ones.

7 Claims, 8 Drawing Sheets

INDUSTRIAL MACHINE CONTROL DEVICE FOR MONITORING MECHANICAL COORDINATE DATA OF A CONTROLLED MACHINE

BACKGROUND OF THE INVENTION

This invention relates to an industrial machine control device for controlling machine tools and other industrial machines, and more particularly to an industrial machine control device in which a first control unit, namely, a numerical control device applies mechanical coordinate data to a second control unit, namely, a programmable controller at all times, and the programmable controller monitors the mechanical coordinate data, thereby to perform a sequence operation as required.

Figure 1:
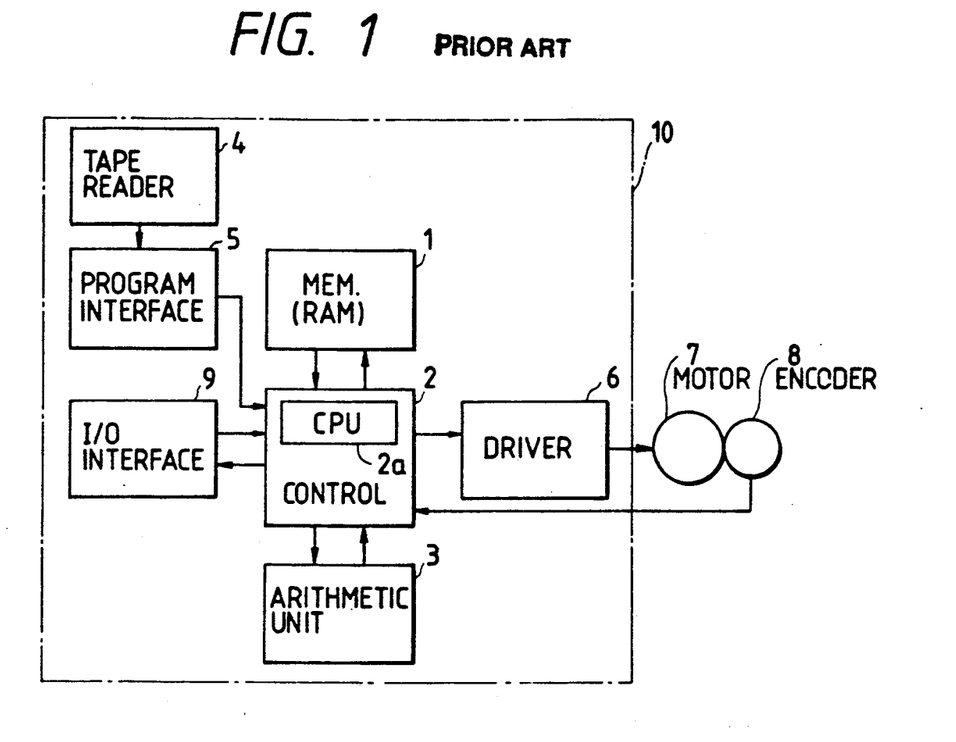
FIG. 1 is a block diagram showing the arrangement of a conventional control device.
Figure 2:
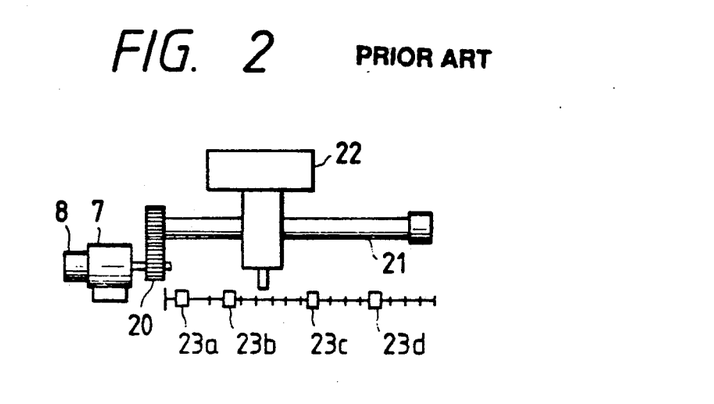
FIG. 2 is an explanatory diagram showing a machine to be controlled.

FIG. 1 is a block diagram showing the arrangement of a conventional industrial machine control device, namely, a numerical control device therein after referred to as "an NC device", when applicable). FIG. 2 is an explanatory diagram showing a machine to be controlled by the device.

In FIG. 1, reference numeral 1 designates a memory made up of a RAM for storing programs and data; 2, a control section essentially comprising a CPU 2a, the control section operating to control the functions of the NC device according to the system software loaded therein; 3, an arithmetic section for performing numerical arithmetic operation under the control of the control section; 4, a tape reader for reading data from a paper tape in which an NC machining program (hereinafter referred to merely as "a machining program", when applicable) has been recorded by punching; 5, a program interface; 6, a drive section including a servo amplifier etc.; 7, a motor for driving a machine to be controlled (hereinafter referred to merely as "a machine:, when applicable); 8, an encoder for outputting a feedback signal; and 9, an input/output interface provided for input signals necessary for starting and stopping the NC device, and output signals such as NC device state signals, and auxiliary function signals for allowing the NC device to control external equipment. The machining program may be recorded on a floppy disc or the like instead of the paper tape.

In FIG. 2, reference numeral 20 designates a speed reducer; 21, a drive mechanism such as a ball screw; 22, a movable table of the machine, which is a tool mounting stand in the case of a lathe; and 23a, 23b, 23c and 23d, limit switches mounted on a stationary part of the machine, for outputting signals representing the current position of the movable table 22, i.e., the arrival of the machine at predetermined positions (hereinafter referred to as "predetermined position arrival signals", when applicable).

Under the control of the NC device 10, the machine operates to machine a workpiece (not shown). The above-described predetermined position arrival signals are applied, for instance, to a programmable controller (not shown, and hereinafter referred to merely as "a PC", when applicable). Before a workpiece is machined, the preparatory operation of a workpiece conveying device (not shown) is carried out, so that a workpiece machined is conveyed out of the machine without delay, according to the control operation of the programmable controller. The predetermined position arrival signals are used not only for achieving the preparatory operation of the workpiece conveying device, but also for performing sequence operations when the movable table reaches the predetermined positions.

With the above described conventional NC device, some detectors such as limit switches are provided at the predetermined positions to output the predetermined position arrival signals. The detectors are relatively short in service life. Therefore, the employment of the NC device is low in reliability and not so economical.

On the other hand, recently the following machining method has been extensively employed. Various kinds of workpieces are run on a single machining line, and the machine automatically changes the tool in correspondence to a workpiece coming in, so that a variety of workpieces are machined on one and the same machining line.

With such a machining line, sometimes all of the workpieces may be different in size or in configuration. It is necessary to change (according to a workpiece to be machined) the position where, upon arrival of the movable table, the preparatory operation of the workpiece conveying device should be started; that is, the machine's predetermined position.

For this purpose, with the conventional NC device, the positions of the limit switches must be changed resulting in some difficulty.

SUMMARY OF THE INVENTION

Accordingly, an object of this invention is to eliminate the above-described problems accompanying conventional NC devices.

Another objection of the invention is to provide an industrial machine control device which can provide a predetermined position arrival signal with no detectors attached to an industrial machine.

The other object of the invention is to provide an industrial machine control device which, with no detectors attached to an industrial machine to be controlled, gives a sequence control to the machine when the movable table reaches an aimed predetermined position.

The foregoing, and other objects of the invention have been achieved by the provision of an industrial machine control device which, according to the invention, comprises: a first control unit including a data processing section which essentially comprises a memory and a central processing unit to analyze and operate numerical data inputted through an input device, and the first control unit numerically controlling a machine according to an output of the data processing section; a second control unit including at least a memory and a central processing unit to give a sequence control to the machine according to a predetermined program; and a bus connected between the first and second control units, for transmission of data therebetween. The first control unit further includes mechanical coordinate data outputting means for outputting, at all times, mechanical coordinate data which is calculated by the data processing section, and the second control unit further includes mechanical coordinate data monitoring means for monitoring the mechanical coordinate data inputted by the first control unit, to provide a signal when the mechanical coordinate data coincides with an aimed value.

In an industrial machine control device according to a second aspect of the invention, the mechanical coordinate data of an industrial machine to be controlled which is inputted through a bus by a programmable controller is stored in a mechanical coordinate data memory, and the region data for determining a mechanical coordinate region where a predetermined position arrival signal indicating the arrival of the machine at a predetermined position is outputted, is stored in a region data memory in advance. The present position data of the machine is stored in a present position data memory. A predetermined position arrival signal is outputted when the value of the present position data memory comes in the mechanical coordinate region which is calculated from the value of the mechanical coordinate data memory and the value of the region data memory.

In an industrial machine control device according to a third aspect of the invention, the mechanical coordinate data is stored in a mechanical coordinate data memory in advance to provide a signal indicating the arrival of a machine to be controlled at a predetermined position, and a predetermined position arrival signal is outputted when the value of the present position data memory comes in the mechanical coordinate region which is calculated from the value of the mechanical coordinate data memory and the value of the region data memory.

In a numerical control device according to a fourth aspect of the invention, the mechanical coordinate data specified by a machining program is stored in a mechanical coordinate data memory and region data specified by the machining program in a region data memory.

A predetermined position arrival signal is outputted when the value of the present position data memory comes in the mechanical coordinate region which is calculated from the value of the mechanical coordinate data memory and the value of the region date memory.

BRIEF DESCRIPTION OF THE DRAWINGS

In the accompanying drawings.

DESCRIPTION OF THE PREFERRED EMBODIMENTS

Figure 3:
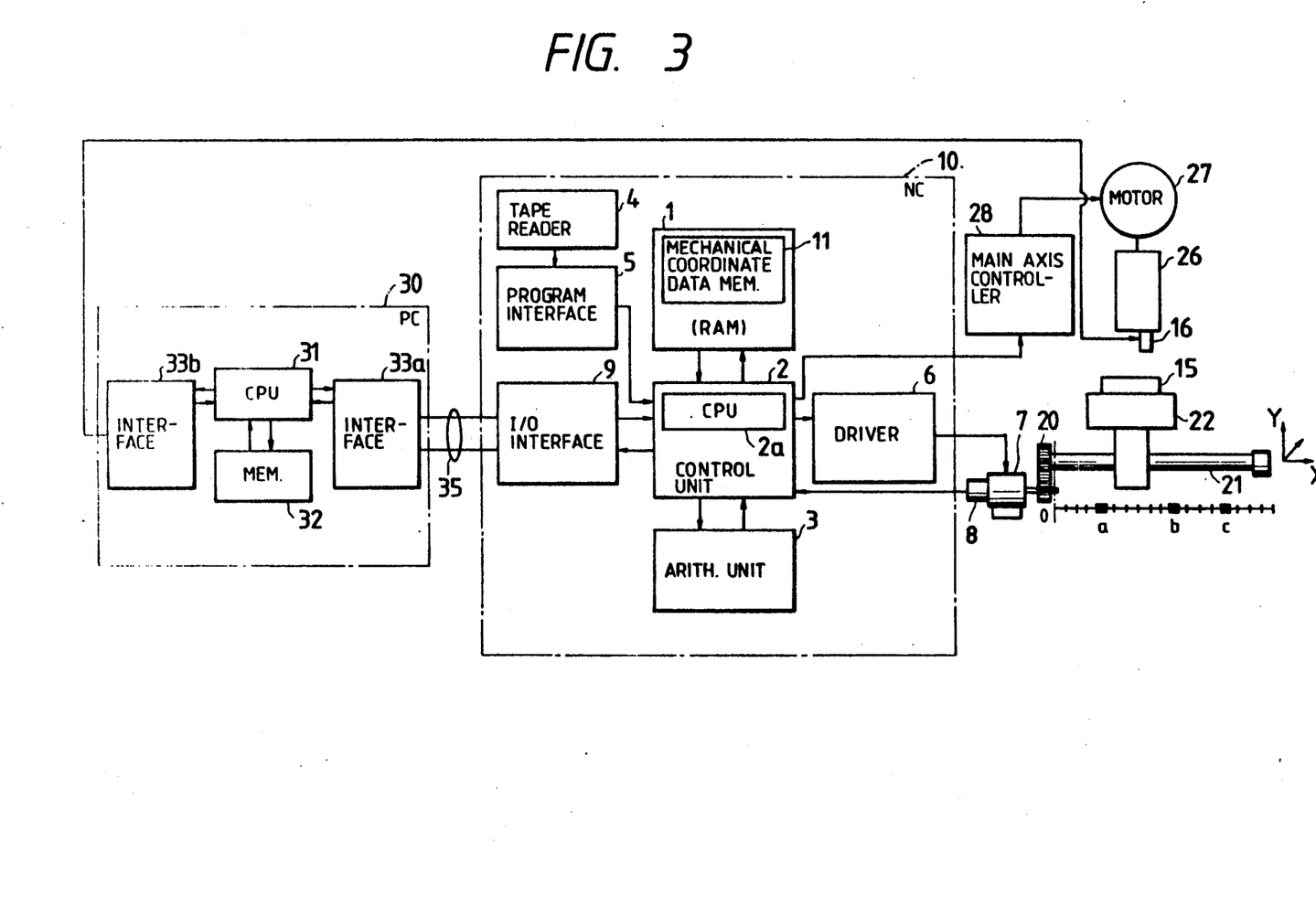
FIG. 3 is an explanatory diagram, partly as a block diagram, showing the arrangement of an industrial machine control device according to this invention.
Figure 4:
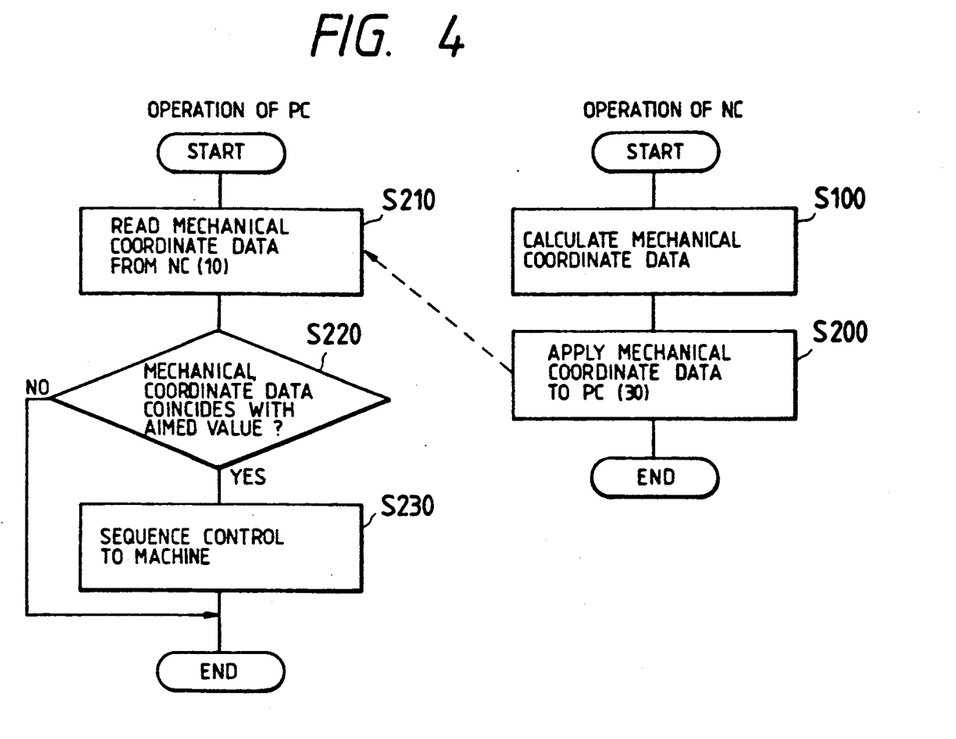
FIG. 4 is a flow chart for a description of the operation of the industrial machine control device shown in FIG. 3.

FIG. 3 is an explanatory diagram, partly as a block diagram, showing the arrangement of one embodiment of this invention. FIG. 4 is a flow chart for a description of the operation of the embodiment shown in FIG. 3.

In FIG. 3, those parts which have been previously described with reference to FIGS. 1 and 2 are therefore designated by the same reference numerals or characters.

Further in FIG. 3, reference numeral 11 designates a mechanical coordinate data memory which, during the control of a machine to be controlled, stores the mechanical coordinate data corresponding to the present position of the machine which is calculated by the arithmetic section 3 under the control of the control section 2 at all times; 15, a workpiece; 16, a tool; 26, a spindle; 27, a spindle motor; 28, a spindle controller for controlling the spindle motor; and a, b and c, the predetermined positions of the machine where a sequence control is given to the machine - for instance, when the movable table 22 reaches the point a, the workpiece conveying device is caused to prepare to convey the workpiece out of the machine.

Further in FIG. 3, reference numeral 30 designates a programmable controller for performing sequence control according to a predetermined program; 31, a CPU (central processing unit) which reads a program out of memory according to a predetermined sequence, decodes the instruction words thereof, and performs, according to the contents of the instruction words, the loading of input data, logical operations and other operations, and transmission of output data; 32, a memory for storing programs, the results of operations, and necessary data; and 33a and 33b, input/output interfaces.

The term "programmable controller" as used herein is intended to mean a control unit which fundamentally comprises the above described circuit elements 31, 32, and 33a and 33b, and it may be a personal computer or the like (hereinafter referred to as "a PC", when applicable).

A parallel bus 35 is connected between the NC device 10 and the PC 30 through the input/output interfaces 33a and 33b, so that control signals and state signals are transmitted therebetween through the parallel bus 35.

The operation of the embodiment of the invention will be described with reference to FIG. 4.

First, the operation of the NC device 10 will be described.

Upon reception of a start instruction from the PC 30, the NC device 10 starts the numerical control of the machine. In Step S100, the present position of the machine is calculated by the arithmetic section 3 with the aid of the control section 2. The mechanical coordinate data corresponding to the present position thus calculated is stored in the mechanical coordinate data memory 11. In Step S200, the data stored in the mechanical coordinate data memory 11 is applied through the data bus 35 to the PC 30 at all times. In FIG. 3, the broken line arrow indicates the transfer of the data through the bus 35.

Now, the operation of the PC device will be described. In Step S210, the PC reads the mechanical coordinate data transferred from the NC device 10. Then, in Step S220, it is determined whether or not the mechanical coordinate value coincides with the aimed value. If "yes", in Step S230, the PC gives a sequence control to the machine.

Thus, with no detectors such as limit switches attached to the machine, the sequence operation of the machine is carried out when the movable table 22 arrives at the predetermined position. The aimed position can be readily changed by changing the data set in the memory of the PC 30.

Figure 5:
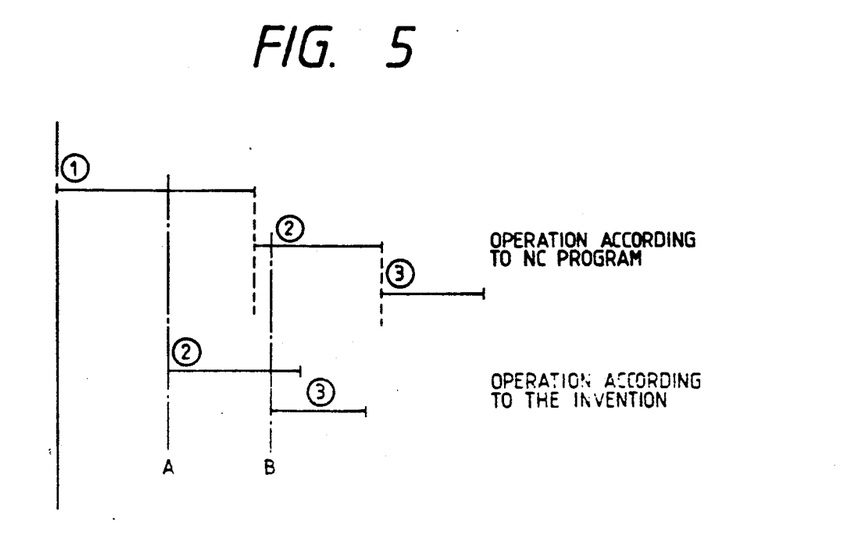
FIG. 5 is an explanatory diagram for a description of the operation of the industrial machine control device shown in FIG. 3.

In general, the operation of the NC is such that, as shown in FIG. 5, only when an operation according to one program is ended, an operation according to the following program can be started. In FIG. 5, for instance reference character (1) designates the movement of a shaft; (2), the replacement of a tool; and (3), the vertical movement of an arm. Those operations (1), (2), and (3) are carried out in the stated order. However, according to the embodiment of the invention, during the program, for instance at the point A or B, the sequence operation can be performed under the control of the PC 30, with the result that the machining time can be reduced as much.

For instance, the replacement of a tool by an automatic tool exchanging device is, in general, carried out after the machine has been returned to the original point. However, a critical position may be provided before the original point, at which position the tool can be replaced without touching other parts; that is, it can be handled in safety. In this case, the sequence operation, i.e., the replacement of the tool can be performed at the critical point thus selected, and the machining time can be reduced.

For this purpose, a limit switch may be used. However, the employment of the limit switch is disadvantageous in that it will take a lot of time to position the limit switch. The critical position may be determined by using a timer. However, the use of the timer is also disadvantageous in that the timer itself is variable in characteristic, and it is rather difficult to set a time instance suitable for determination of the critical position. On the other hand, the above-described embodiment of the invention can positively determine the critical position.

In the case where a number of workpieces different in kinds are run on one and the same line, the invention can readily handle them, with different aimed values set for different workpieces.

The NC device 10 applies mechanical coordinate data to the PC 30 at all times, and the PC 30 refers to the data when necessary. Therefore, it is unnecessary to provide a procedure for the transmission of data between the NC device 10 and the PC 30. For instance, the following procedure is unnecessary: The PC 30 issues a data request, the NC device 10 discriminates the request code, and reads the data requested such as for instance the present position data, and applied it to the interface; and the PC 30 loads the data, and so forth. Hence, the necessary data can be obtained without time delay.

In the case where the machine is stopped at a certain position, and the data on the position is needed, the data may be obtained by using the predetermined procedure. However, in the case where it is required to obtain the data on a position of the machine in motion, the machine will move to another position while operation is being performed according to the procedure, and therefore the obtained data are useless. Thus, the invention is advantageous in that necessary data can be obtained without a procedure, i.e., without time delay.

As was described above, in the industrial machine control device according to the invention, the mechanical coordinate data corresponding to the present position of a machine to be controlled which is calculated by the first control unit adapted to numerically control the machine is applied at all times to the second control unit adapted to perform the sequence control of the machine, and the second control unit monitors the mechanical coordinate data inputted, and outputs a signal when the data coincides with the aimed value. Therefore, the industrial machine control device is high in reliability and excellent in economy, and it can change the predetermined position freely where the machine is operated sequentially. Furthermore, the control device of the invention can allow the machine to perform its sequential operation during one block of operation according to the machining program.

Figure 6:
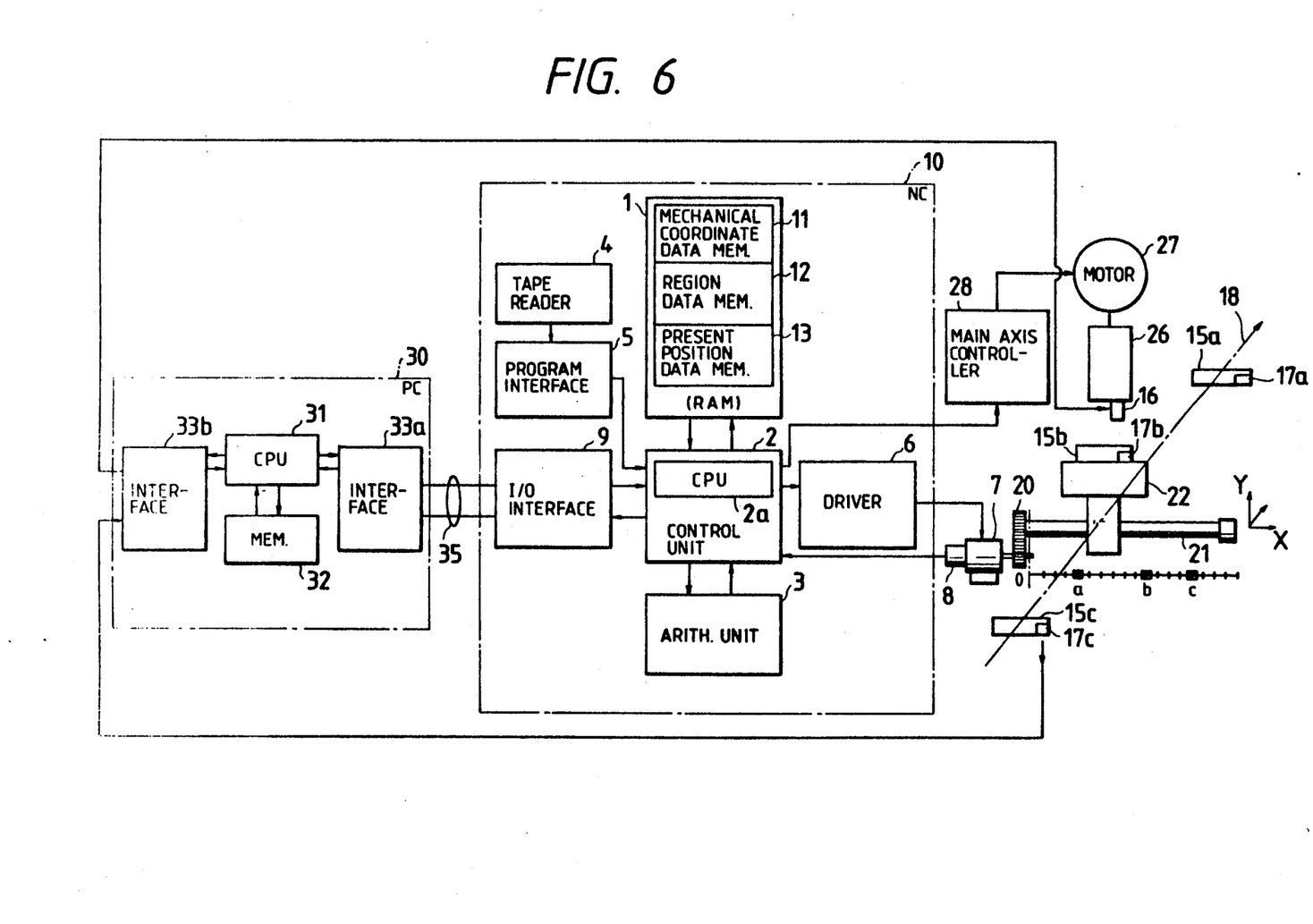
FIG. 6 is an explanatory diagram, partly as a block diagram, showing a second embodiment of this invention.
Figure 7:
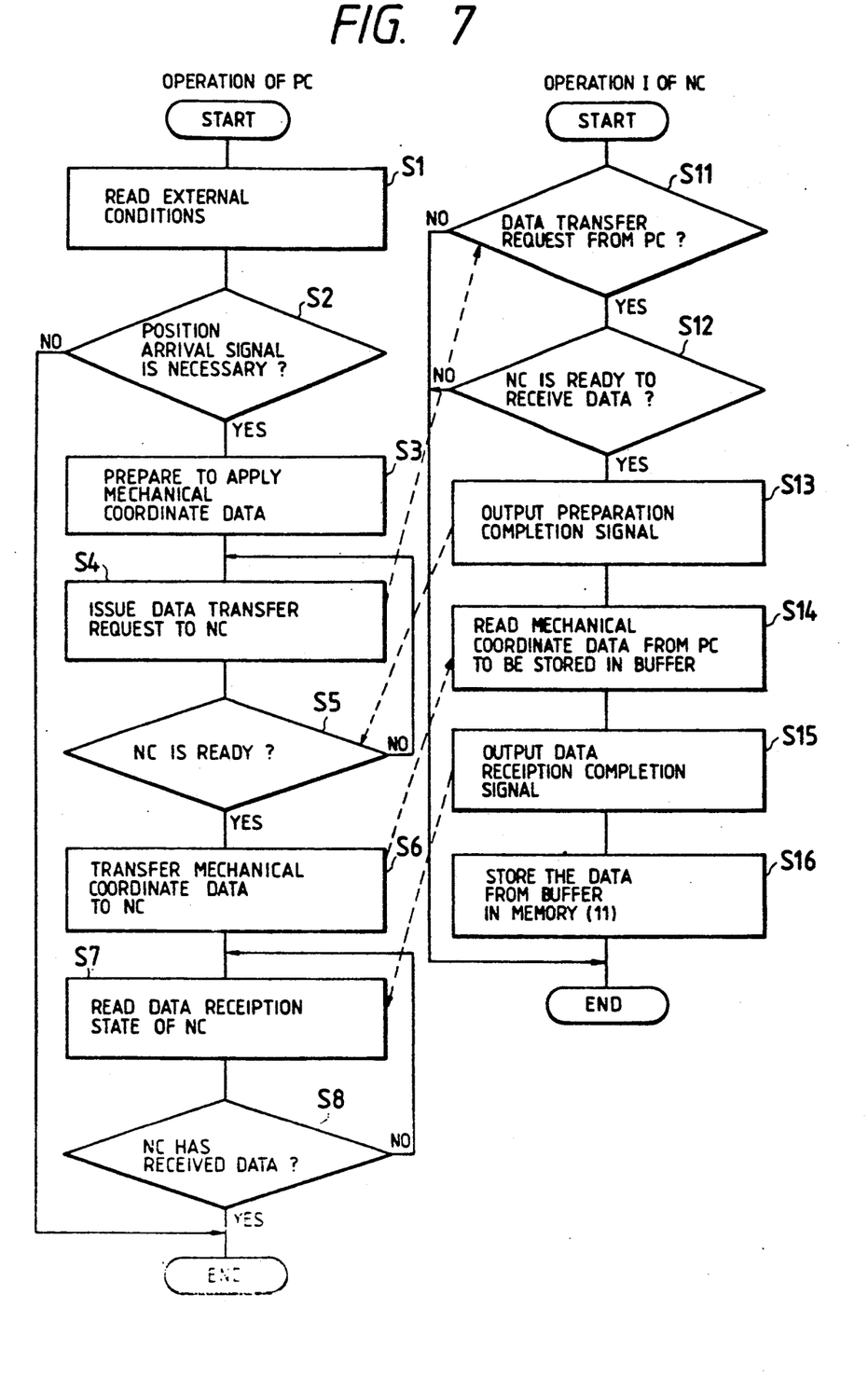
FIG. 7 is a flow chart for a description of the operation of a PC and an operation I of an NC device in the first embodiment of the invention.

FIG. 6 is an explanatory diagram, partly as a block diagram, showing the arrangement of a first embodiment of this invention, and FIG. 7 is a flow chart for a description of the operation of the first embodiment shown in FIG. 6.

In FIG. 6, the parts which have been previously described with reference to FIGS. 1 through 3 are therefore designated by the same reference numerals or characters. Further in FIG. 6, reference characters 15a, 15b and 15c designate workpieces different in kind, i.e., in configuration, in material and in the contents of machining. In this case, different tools 16 must be used for machining the different workpieces. More specifically, the tool used for machining the workpiece 15a must be replaced with another tool when the next workpiece 15b is machined, and the tool used for the latter 15b must be replaced with another tool when the remaining workpiece 15c is machined.

FIG. 6 shows the case where the second workpiece 15b is machined. In other words, the second workpiece 15b is going to be machine, the first workpiece 15a has been machined and conveyed out of the machine, and the third workpiece 15c will be machined after the second workpiece 15b; that is, it is going to be conveyed in the machine. In FIG. 6, the one-dot chain line indicates the direction of flow of workpieces.

Further in FIG. 6, reference characters 17a, 17b and 17c designate sensors for identifying the kinds of workpieces; 26, a spindle; 27, a spindle motor; and 28, a spindle controller for controlling the spindle motor.

As is similar to the first embodiment of the present invention, reference numeral 11 designates a memory for storing mechanical coordinate data inputted by the PC 30. The term "mechanical coordinate data" as used herein is intended to mean the data that, in the case where, as was described before, the preparatory operation of the workpiece conveying device is performed before the machining of a workpiece has been accomplished, indicates the mechanical coordinates of the predetermined position where, upon arrival of the movable table 22, the preparatory operation of the workpiece conveying device is started. In addition, the term "first memory" as used herein is intended to means the mechanical coordinate data memory 11.

Further in FIG. 6, reference numeral 12 designates a region data memory for storing region data in advance. The term "region data" as used herein is intended to mean the data that determines a mechanical coordinate region so that, when the movable table 22 goes in the region, the predetermined position arrival signal is produced.

This will be described in more detail. When the machine is under the control of the NC machine, the machine's current position data, i.e., the present position data of the movable table 22 is calculated by the arithmetic section with the aid of the control section 2 at all times, and therefore the NC device 10 can detect the position of the predetermined part of the machine relatively accurately. However, in the case where the NC device outputs a signal when the movable table 22 reaches a predetermined position, it can output the signal only at the time instant when the current position of the movable table 22 coincides with the mechanical coordinate value of the predetermined position, because the movable table 22 being moved will pass the aimed position quickly. Accordingly, the external equipment, namely, the PC cannot detect the signal.

In order to eliminate this difficulty, the predetermined position arrival signal should have a certain width. As for the PC, it is unnecessary that the occurrence of the signal is accurate to an extent of 1 μ; that is, the signal should be outputted with a time width of around 1 mm. In order to provide the time width, in the invention, the signal is outputted when the current position of the machine comes in the mechanical coordinate region determined by the region data with respect to the aimed predetermined position. The data for determining the region is referred to as "region data".

The term "mechanical coordinate region" as used herein is intended to mean the region which is defined by $A+B$ and $A-B$ where A is the mechanical coordinate data, and B is the region data.

In addition, the term "second memory" as used herein is intended to mean the region data memory 12.

Further in FIG. 6, reference numeral 13 designates a present position data memory for storing the present position data which is calculated by the arithmetic section 3 with the aid of the control section 2 when the machine is under the control of the NC machine. The present position data memory 13 will be referred to as "a third memory", when applicable.

Now, the operation of storing data in the second memory 12 will be described.

First, the control operations of the PC 30 will be described with reference to the flow chart of FIG. 7. In Step S1, the PC reads external conditions. In Step S1, the PC 30 operates in accordance with the sequence control procedure, to unload the workpiece 15a from the movable table 22, and then to load the workpiece 15b on table 22. Then, the PC 30 receives the output signal of the sensor 17b to detect the kind of the workpiece 15b.

A machining program has been predetermined for the workpiece. Therefore, upon detection of the kind of the workpiece, the PC 30 transmits a machining program section signal through the bus 35 to the NC machine 10. In response to the selection signal, the NC device 10 selects the machining program for the workpiece 15b. The machining program specifies a tool to be used for machining the workpiece 15b, and the NC device 10 transmits a tool specifying signal through the bus 35 to the PC 30. In response to the tool specifying signal, the PC operates to exchange the tool.

In Step S2, it is determined whether or not the predetermined position arrival signal is necessary for the workpiece. If "yes", then in Step S3 the PC prepares to apply a mechanical coordinate data to the NC device 10. That is, the PC has known (by programming) that, when the machine, i.e., the movable table arrives at a predetermined position, it needs a signal indicating the arrival. Therefore, the PC selects the mechanical coordinate data corresponding to the workpiece among the those stored; for instance a mechanical coordinate data A indicating the position (a) in FIG. 1, and prepares to transmit it to the NC device 10.

In Step S4, the PC issues a data transfer request to the NC device 10. In Step S5, it is determined whether the NC device 10 has prepared to receive a mechanical coordinate data. If "no", Step S4 is effected again. If "yes", in Step S6, the mechanical coordinate data A is transferred to the NC device 10. In Step S7, the PC reads the data reception state of the NC device 10. In Step S8, it is determined whether or not the NC device 10 has received the data. If "no", Step S7 is effected again. If "yes", the operation is ended. In the case where, in Step S2, the result is "no", the operation is ended, because the predetermined position arrival signal is not needed.

Now, an operation I of the NC device 10 will be described.

In Step S11, it is determined whether or not the NC device has received the data transmission request from the PC 30. If "yes", then in Step S12, it is determined whether or not the NC device is ready to receive the data. If "yes", then in Step S13, the NC device 10 outputs a preparation completion signal. In Step S14, the NC device receives the mechanical coordinate data A from the PC 30, and stores it in a buffer memory included in the input/output interface. In Step S15, the NC device supplies a data reception completion signal to the PC 30, and then in Step S16 the mechanical coordinate data A is transferred from the buffer memory to first the memory 11, where it is stored. Thus, the operation I of the NC device is ended.

In FIG. 7, the broken line arrows indicated the transfer of data through the bus 35.

Figure 8:
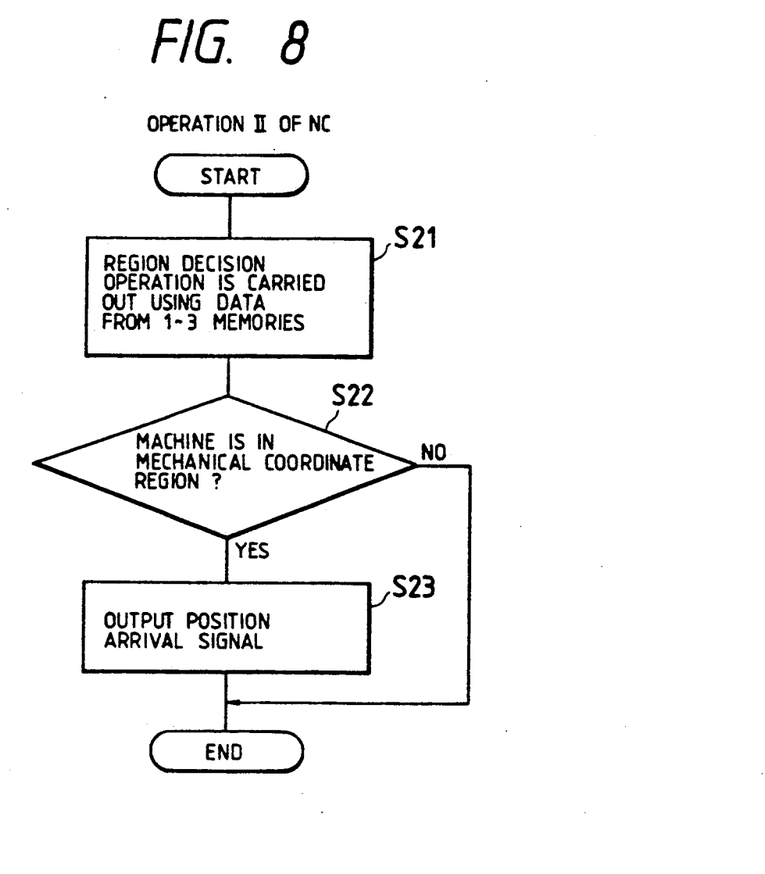
FIG. 8 is a flow chart for a description of an operation II of the NC device in the second embodiment of the invention.

When the data has been stored in the first memory 11 in the above-described manner, the NC device 10 will perform an operation II, with respect to the outputting of a predetermined position arrival signal, according to a flow chart of FIG. 8.

When, after the data has been stored in the first memory 11, a start instruction is applied to the NC device 10 by the PC 30, the NC device 10 starts the numerical control of the machine. In Step S21, by using the data stored in the first, second and third memories, a region decision operation is carried out to determine whether or not the movable table 22 has moved into the mechanical coordinate region to output the predetermined position arrival signal. This operation is carried out according to the following expression:

$$A - B \leq C \leq A + B \quad (1)$$

where A is the data stored in the first memory, B is the data stored in the second memory, and C is the data stored in the third memory.

In Step S22, it is determined whether or not the machine, i.e., the movable table, is in the mechanical coordinate region to output the predetermined position arrival signal. If "yes", i.e., if expression (1) is satisfied, then in Step S23 the predetermined position arrival signal is outputted.

The predetermined position arrival signal thus outputted is applied through the bus 35 to the PC 30, and the latter 30 performs a sequence control operation to allow the workpiece conveying device to prepare to convey the workpiece.

In the above-described embodiment, only one predetermined position is provided. On the other hand, in the case where a plurality of predetermined position arrivals signal are outputted, in the operations of the PC 30 and the NC device 10 as shown in FIG. 8, for instance a plurality of mechanical coordinate data $A_1$, $A_2$ and $A_3$ with data indicating the signal outputting sequence are transferred from the PC 30 to the NC device 10 and stored in the first memory 11. In the operation II of the NC device 10 as indicated in FIG. 8, the data are read in the above-described sequence; for instance, the data $A_1$ is read, and the signal is outputted, then the data $A_2$ is read, and the signal is outputted, and so forth.

In the above-described embodiment, the workpieces to be machined are different in kind. However, in the case where a plurality of workpieces of one kind are machined, it is unnecessary to replace the tool; that is, the same tool can be used for all the workpieces, and the same mechanical coordinate data can be transferred from the PC 30 to the NC device 10.

In a second embodiment of the invention, one and the same workpieces are machined, and the position where the predetermined position arrival signal is outputted is not frequently changed. In this case, the mechanical coordinate data is stored in the first memory 11 of the NC device 10 in advance, and therefore the predetermined position arrival signal can be applied to the PC 30 according to the operation II of the NC device shown in FIG. 8. In the second embodiment, the burden on the PC 30 is reduced to some extent.

Now, a third embodiment of the invention will be described. The third embodiment is equal to the first embodiment except for the contents of the first memory.

Figure 9:
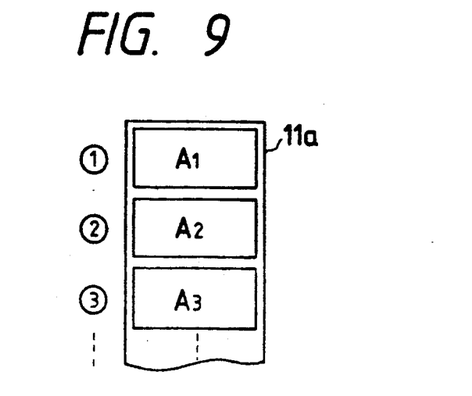
FIG. 9 is an explanatory diagram showing a mechanical coordinate data memory in a third embodiment of invention.

FIG. 9 is an explanatory diagram showing the first memory 11a of the third embodiment. The first memory occupies a region in the memory 1 of the NC device 10. In FIG. 9, reference characters $A_1$, $A_2$, $A_3$, and so forth designate the data in the memory 11a, i.e., mechanical coordinate data specified as parameters in advance; and (1), (2), (3) and so forth, mechanical coordinate request code data (hereinafter referred to merely as "request code data", when applicable) for selecting the data $A_1$, $A_2$, $A_3$, and so forth, respectively. The request code data, as described later, are transferred from the PC 30 to the NC device 10, and serve as selection signals for selecting the mechanical coordinate data.

Figure 10:
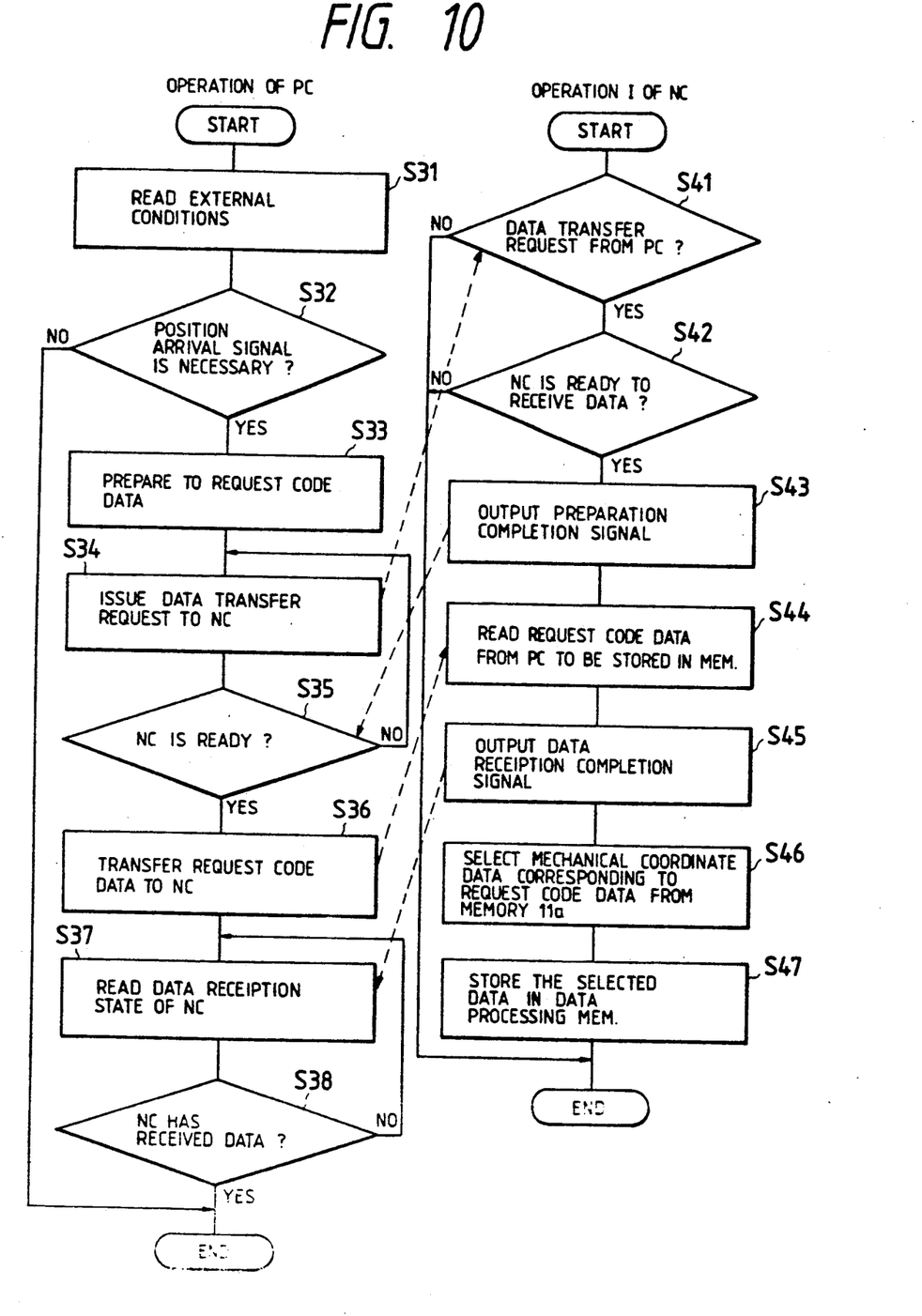
FIG. 10 is a flow chart for a description of the operation of the third embodiment of the invention.

FIG. 10 is a flow chart for a description of the operation of the third embodiment. The operation of the fourth embodiment of the invention will be described with reference to the flow chart.

First the operation of the PC 30 will be described. Similarly as in the case of the second embodiment, in Step S31 the PC reads external conditions. In Step S32 it is determined whether or not a predetermined position arrival signal is necessary for the workpiece. If "yes", then in Step S33 the PC prepares to apply a request code data to the NC device 10. The PC has known (by programming) that, when the machine reaches a predetermined position, the NC device needs a signal representing the arrival of the machine to the position. Therefore, the PC reads the corresponding one of the request code data stored, and prepares to transmit it to the NC device. For instance in the case where the signal is needed at the position (a) in FIG. 6, the PC reads the request code data (1) for selecting the mechanical coordinate data $A_1$ corresponding to the workpiece, and prepares to transmit it to the NC device 10. In Step S34, the PC 30 issues a data transfer request to the NC device 10. In Step S35, it is determined whether or not the NC device 10 is ready to receive the data. If "no", Step S34 is effected again If "yes", in Step S36 the PC transmits the request code data (1) to the NC device 10. Then, in Step S37, the PC detects the data receiving state of the NC device 10. In Step S38, it is determined whether or not the NC device has received the data. If "no", then Step S37 is effected again. If "yes", the operation is ended. If, in Step 32, the result of determination is "no", the operation is ended, because no predetermined position arrival signal is needed.

Now, an operation I of the NC device 10 will be described.

In Step S41, it is determined whether or not the NC device has received a data transfer request from the PC 30. If "yes", in Step S42 it is determined whether or not the NC device is ready to receive data. If "yes", in Step S43 the NC device outputs a preparation completion signal. Then, in Step S44, the request code data (1) transmitted from the PC 30 is read, and stored in a buffer memory included in the input/output interface. In Step S45 the NC device applies a data reception completion signal to the PC 30, and then in Step 46 access is made to the memory 11a to select the mechanical coordinate data $A_1$ corresponding to the request code data (1). In Step S47, the mechanical coordinate data $A_1$ thus selected is stored in a data processing memory. Thus, the operation I of the NC device 10 has been ended.

In FIG. 10, broken line arrows indicate the transfer of data through the bus 35.

The operation of outputting the predetermined position arrival signal after the storage of the mechanical coordinate data in the data processing memory is equal to that in the first embodiment shown in FIG. 8 except that, in Step S21 of the flow chart shown in FIG. 8, the mechanical coordinate data for arithmetic operation are the data stored in the first memory 11 in the first embodiment, and the data stored in the data processing memory in the third embodiment.

Now, a fifth embodiment of the invention will be described. The arrangement of the fifth embodiment is equal to that of the second embodiment.

Figure 11:
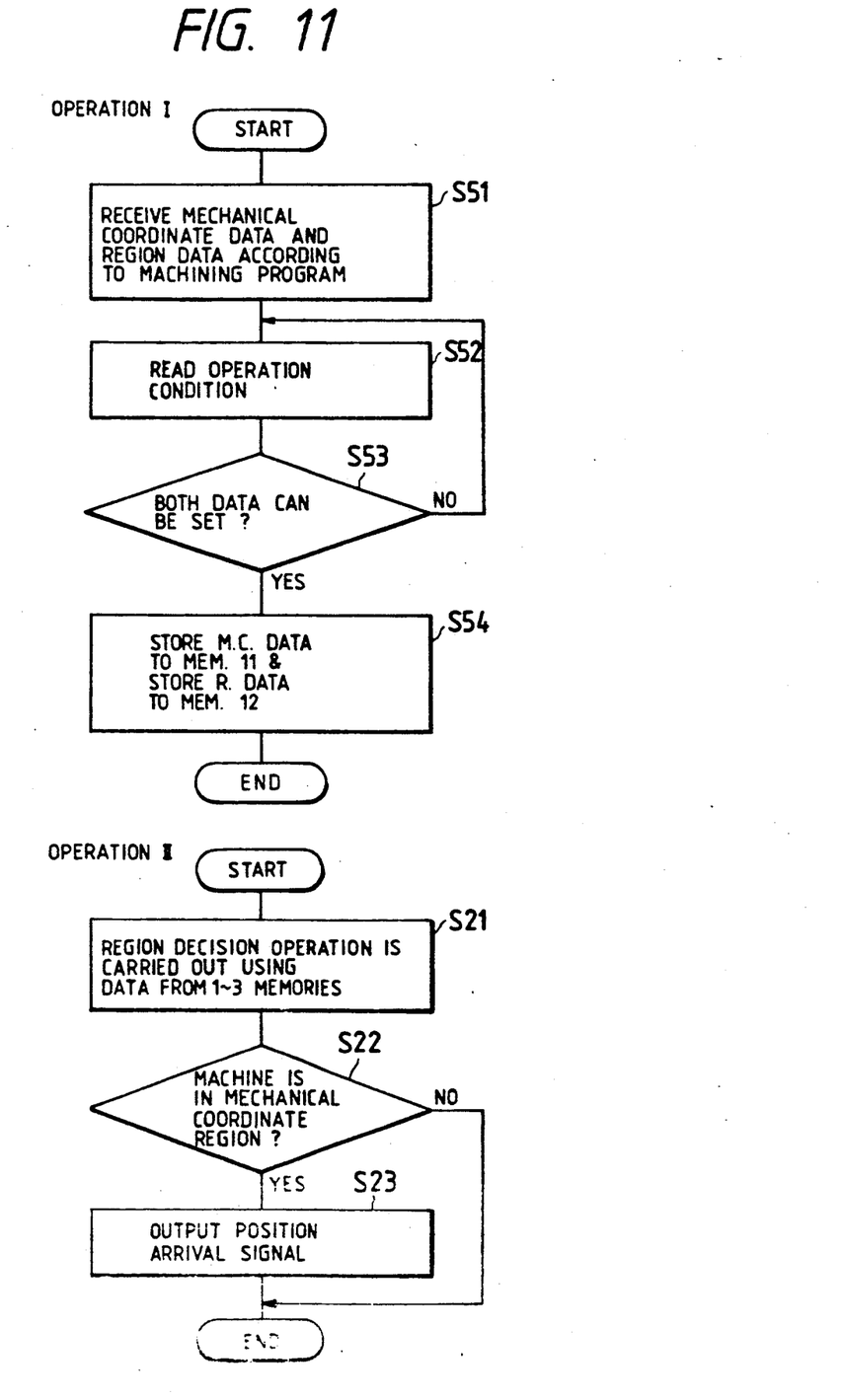
FIG. 11 is a flow chart for a description of the operation of a fourth embodiment of the invention.

FIG. 11 is a flow chart for a description of the operation of the fifth embodiment. In the fifth embodiment, data on mechanical coordinates are not transmitted between the PC 30 and the NC device 10.

First, an operation I thereof will be described. The PC 30 detects the kind of a workpiece 15, and applies a machining program selecting instruction to the NC device. In response to the instruction, the NC device selects a machining program. According to the tool specifying signal, the tool is exchanged with the aid of the PC 30. Thus, the machine is operated under the control of the NC device 10, to machine the workpiece. When, under this condition, mechanical coordinate data and region data are specified according to the machining program, in Step S51 the mechanical coordinate data and the region data are received. In Step S52, the operating condition of the machine is read. Then, in Step S53 it is determined that both of the data can be set. If "no", Step S52 is effected again. If "yes", in Step S54 the mechanical coordinate data and region data specified by the machining program are stored in the first and second memories 11 and 12, respectively. Thus, the operation I has been ended.

Similarly as in the second embodiment, the mechanical coordinate data and the region data are stored in the first memory 11 and the second memory 12, respectively.

An operation II of outputting a predetermined position arrival signal after the storage of the mechanical coordinate data and the region data in the first memory 11 and the second memory 12 is the same as Steps S21 through S23 in FIG. 8.

When another mechanical coordinate data and another region data are specified according to another machining program, similarly as in the above-described case the predetermined position is changed, and the corresponding predetermined position arrival signal is outputted.

The fifth embodiment may be so designed that, as in the third embodiment, a plurality of mechanical coordinate data have been stored in advance, and one of those data is selected in correspondence to the request code data inputted according to the machining program.

In the fourth or fifth embodiment, only one predetermined position is provided, and the workpieces to be handled are different in kind. However, similarly as in the case of the second embodiment, the technical concept of the third or fourth embodiment is applicable to the case, too, where a plurality of predetermined position arrival signals are outputted, and a number of workpieces of one kind are machined.

As was described above, according to the second aspect of the invention, the mechanical coordinate data of a predetermined position of the machine is transferred from the PC, and the predetermined position arrival signal is outputted according to the data thus transferred, the region data and the current position data. Thus, the numerical control device of the invention is high in reliability and excellent in economy, and it can freely change the position where the predetermined position arrival signal.

Furthermore, according to the third aspect of the invention, as was described above, the mechanical coordinate data of a predetermined position of the machine has been stored in advance, and the predetermined position arrival signal is outputted according to the data thus stored, the region data and the current position data, thus eliminating the transferring of the mechanical coordinate data from the PC to the NC device. Hence, the numerical control device has an effect of reducing the burden of the PC as well as the effect of the NC device provided according to the first aspect of the invention.

With the NC device according to the fourth aspect of the invention, the mechanical coordinate data of a predetermined position of the machine is specified according to the machining program, and the predetermined position arrival signal is outputted according to the mechanical coordinate data thus specified, the region data and the current position data. Therefore, the NC device has an effect that a sequence operation can be performed during one block of operations, in addition to the effect of the NC device provided according to the first aspect of the invention.

What is claimed is:

1. An industrial machine control device comprising:
   a first control unit including a data processing means having a memory and a central processing unit to analyze and operate numerical data inputted through an input device, said data processing means controlling an industrial machine numerically according to an output of said data processing means, and mechanical coordinate data outputting means for outputting, at all times, mechanical coordinate data which is calculated by said data processing means and which indicates the position of the machine;
   a second control unit including at least a memory and a central processing unit to carry out a sequence control of said machine according to a predetermined program and mechanical coordinate data monitoring means for monitoring said mechanical coordinate data inputted by said first control unit to provide a signal when said mechanical coordinate data coincides with a target value; and
   a bus connected between said first and second control units, for transmission of data therebetween.

2. An industrial machine control device in which numerical data inputted through an input device is subjected to data processing by a data processing section having a memory and central processing unit and an industrial machine is controlled numerically according to an output of said data processing section comprising:
   a first memory for storing the mechanical coordinate data of said machine;
   a second memory for storing, in advance, region data for determining a mechanical coordinate region where a predetermined position arrival signal indicating the arrival of said machine at a predetermined position is outputted;
   a third data memory for storing the present position data of said machine; and
   means for outputting the predetermined position arrival signal when the value of said third memory comes in the mechanical coordinate region which is calculated from the data stored in said first memory and the data stored in said second memory.

3. An industrial machine control device as defined in claim 2, wherein the mechanical coordinate data of said machine is inputted through a bus by a programmable controller which gives a sequence control to said industrial machine.

4. An industrial machine control device as defined in claim 2 wherein the mechanical coordinate data of said machine is stored in advance in said first memory to provide a signal indicating the arrival of said machine at a predetermined position.

5. An industrial machine control device as defined in claim 2 wherein the mechanical coordinate data of said machine is specified by a machining program and the mechanical coordinate region is also specified by the machining program.

6. An industrial machine control device as defined in claim 2, wherein the data input to the third memory is calculated by said data processing section and indicates the position of the machine.

7. An industrial machine control device as defined in claim 1, wherein said target value is stored in said second control unit.

* * * * *